(No Model.)
J. F. CUMMINGS.
UNDERGROUND CONDUIT.
No. 549,995. Patented Nov. 19, 1895.
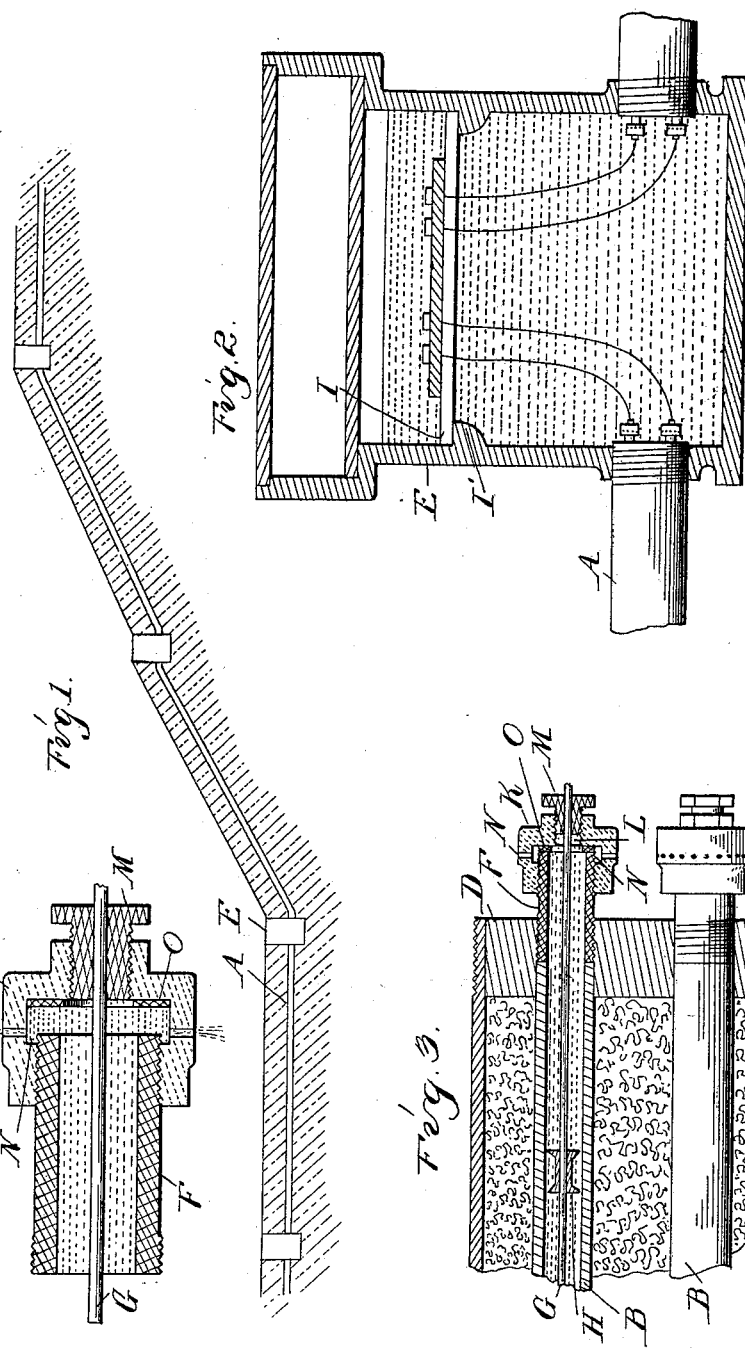
Witnesses
A. L. Hobby
L. J. Whittemore
Inventor
James F. Cummings
By Mr. S. Sprague Son
Atty's.

UNITED STATES PATENT OFFICE.

JAMES F. CUMMINGS, OF DETROIT, MICHIGAN, ASSIGNOR TO THE CUMMINGS & ENGELMAN CONDUIT COMPANY, OF SAME PLACE.

UNDERGROUND CONDUIT.

SPECIFICATION forming part of Letters Patent No. 549,995, dated November 19, 1895.

Application filed March 4, 1895. Serial No. 540,477. (No model.)

*To all whom it may concern:*

Be it known that I, JAMES F. CUMMINGS, a citizen of the United States, residing at Detroit, in the county of Wayne and State of Michigan, have invented certain new and useful Improvements in Underground Conduits, of which the following is a specification, reference being had therein to the accompanying drawings.

The invention consists in the construction of an electrical conduit especially designed for transmitting currents of high tension.

The construction embodies a duct or ducts connecting into junction-boxes or manholes or otherwise divided into sections, with a nonhardening fluid insulation around the conductor, so arranged and constructed that from any desired section of duct or conduit the liquid can be withdrawn and the conductor removed or repaired without in any way disturbing the other sections or ducts.

The invention further consists in the construction of the valve for controlling the ends of the ducts, and, further, in the construction, arrangement, and combination of the various parts, all as more fully hereinafter described.

In the drawings, Figure 1 is a diagram elevation of a few sections of my conduit as in use on uneven ground. Fig. 2 is a section through one of the junction-boxes. Fig. 3 is an enlarged section of the end of the conduit, and Fig. 4 is an enlarged section of one of the ducts.

A is a conduit-casing. I have shown it as an outer covering for a series of ducts. I may use it as the duct for the conductor, but prefer to employ the construction hereinafter described.

B are a series of ducts, preferably of wood, supported in the conduit-casing. I have shown them surrounded with a non-conducting compound, such as asphalt.

D are end plugs supporting the ends of the ducts.

E are junction-boxes into which the ends of the conduits connect and into which the ends of the ducts project.

I have shown non-conducting nipples F of vulcanized fiber screwed into the plug D to form the inward extension of the ducts, and I deem this the preferable way to construct this extension.

In each duct is a conductor G, supported free from the sides by the spools or spacing-blocks H, their ends extending into the junction-boxes, where they may be connected to suitable switches supported on a partition I, supported on lugs I'.

K are end caps for the ducts or nipples F, preferably of glass and screwed onto the inward extension of such ducts or nipples in the junction-box. These caps have a central aperture L to permit the conductors to pass from the ducts into the junction-box.

M are packing-glands for packing the joint around the wire at the point where it passes through the cap.

N are apertures in the side of the caps leading into the annular groove N'.

O is a packing-ring between the cap and duct.

The parts being thus constructed it will be seen that the conduit is divided up into sections of a length equal to the distance between the junction-boxes. If, as is usual, these conduits are arranged with a grade, I can fill the ducts around the wires with a fluid non-conductor, such as oil, by pouring it into the higher junction-box and allowing it to flow through the ducts to a lower box and then close up the end of such duct by screwing in its cap K until the apertures N are closed. A duct or ducts can be emptied of its oil by opening the lower valve and allowing the oil to flow into the lower box, from which it may be pumped into any desired receptacle. Then the conductor can be withdrawn, if desired, replaced, and the duct refilled.

In building this type of conduit in hilly ground this is a very desirable construction, as I am able to arrange the inclined sections of such length as to have but a limited hydrostatic pressure by arranging the boxes nearer together. Such an insulation has proven to be as nearly perfect as anything yet known, and, if desired, bare wires can be used in the ducts with currents of very high voltage, as is desired for long-distance transmission.

If desired, the oil may be used to fill the junction-boxes above the switches, as shown in Fig. 2.

What I claim as my invention is—

1. In a conduit for electrical conductors, a tubular duct, a conductor supported therein, boxes dividing the duct into sections, a non-hardening non-conducting fluid, filling the duct, and means for opening and closing the sections of the ducts whereby each section may be filled or emptied of its fluid independently of the other sections.

2. In a conduit for electrical conductors, the combination of a conduit having an inner duct, a conductor supported therein free from the sides thereof, a junction box into which the duct leads, and a valve controlling the duct, substantially as described.

3. In a conduit for electrical conductors, the combination of a conduit comprising an outer casing, and a series of inner ducts divided into sections, and valves to control the end of each duct, as and for the purpose described.

4. In a conduit for electrical conductors, the combination of a conduit comprising an outer casing, and a series of inner ducts, junction boxes into which the conduit leads, dividing the conduit into sections, valves in the boxes controlling each duct independently, and conductors in the ducts passing through the valves, substantially as described.

5. In a conduit for electrical conductors, the combination of a conduit comprising a duct, a junction box into which it connects, the insulating nipple F thereon, the cap K screwed thereon apertured at the end to permit the conductor to pass therethrough and having the apertures N through the sides, substantially as and for the purpose described.

6. In an electrical conductor conduit, the combination with a conduit, having a non-hardening fluid filling, of a wire passing through the filling, a junction box into which the conduit, fluid and wire enter, and a switch in the box below the level of the fluid, substantially as described.

7. In a conduit for electrical conductors composed of separated sections each consisting of a conduit casing, a conductor passing therethrough and beyond the same, a fluid filling in the duct, and removable means for sealing the ends of the duct, substantially as described.

8. In a conduit for electrical conductors, the combination with a series of separated ducts, conductors passing through and beyond the same, a fluid filling in the ducts, and removable means on the ends of each duct for retaining the filling in the ducts, substantially as described.

In testimony whereof I affix my signature in presence of two witnesses.

JAMES F. CUMMINGS.

Witnesses:
L. J. WHITTEMORE,
M. B. O'DOGHERTY.